Patented Sept. 14, 1926.

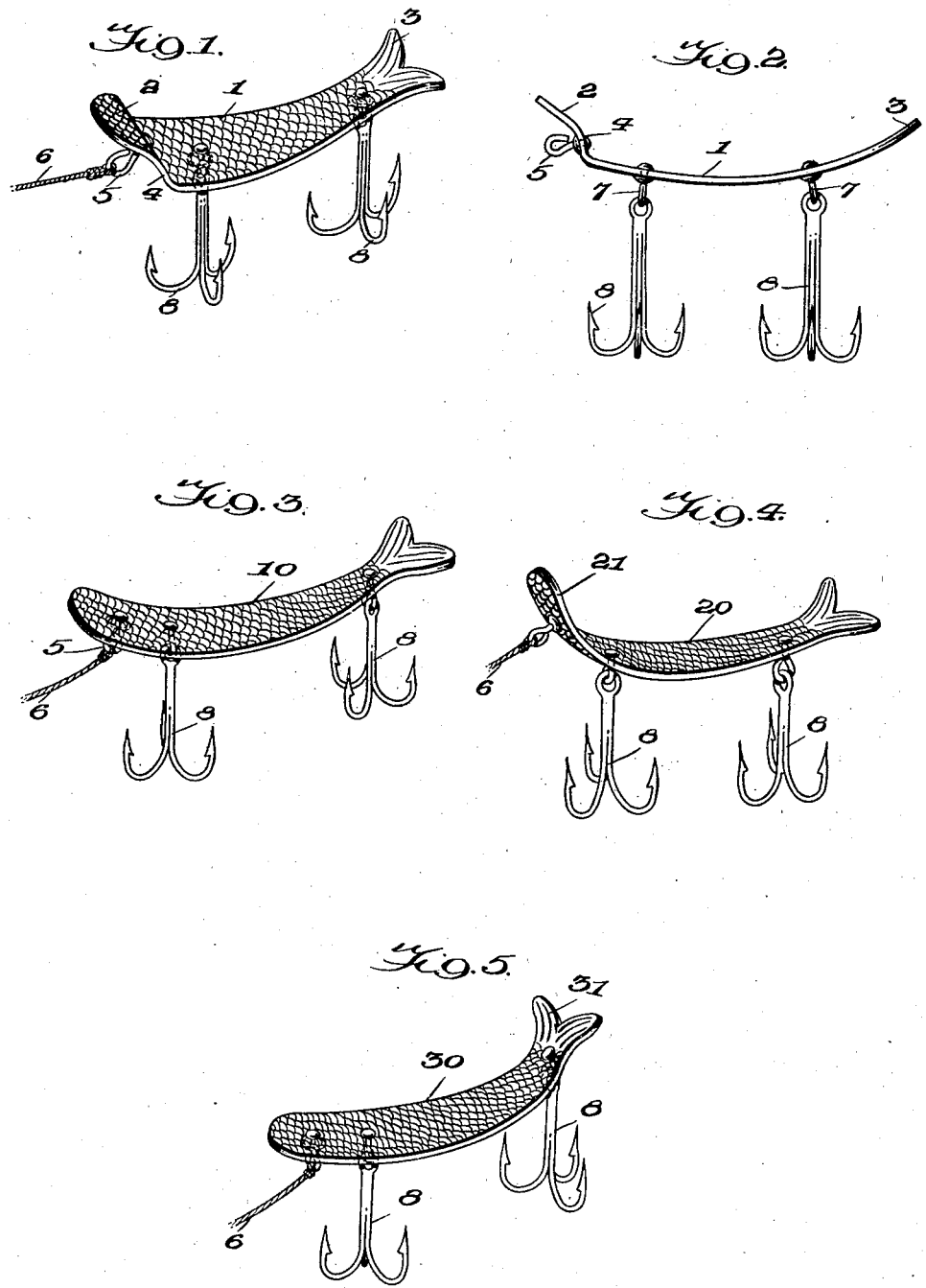

1,599,747

UNITED STATES PATENT OFFICE.

HENRY S. DILLS, OF GARRETT, INDIANA, ASSIGNOR TO THE CREEK CHUB BAIT CO., OF GARRETT, INDIANA, A CORPORATION OF INDIANA.

ARTIFICIAL BAIT.

Application filed August 3, 1925. Serial No. 47,895.

This invention relates to artificial bait and has particular reference to a bait adapted to simulate the movements of a live minnow. To this end the bait is so shaped as to cause the same to wiggle when drawn through the water. There have been a number of attempts to product baits which will simulate a live minnow but these prior baits have all had either a spinning, darting, or swaying movement; whereas, the present bait is so constructed as to present a resistance to being drawn through the water such that the bait immediately begins a sharp wiggle closely resembling a swimming minnow being pursued by a game fish.

Spinning and darting baits or spoons generally cause the line to become twisted and thereby give considerable annoyance to the fisherman, it is therefore an object of the present invention to provide an artificial bait which eliminates these difficulties and yet at the same time gives a very life-like imitation of a live minnow.

A further object of the invention resides in the provision of an artificial bait in simulation of a live minnow and which will travel through the water at a depth which varies inversely with the rate of travel.

Other objects and advantages of the invention will be apparent from the following detailed description when taken in connection with the accompanying drawings, in which:—

Figure 1 is a perspective view of one form of my improved artificial bait.

Figure 2 is a side elevation of the form shown in Figure 1.

Figures 3, 4 and 5 are perspective views of three modified forms of the invention.

Referring to the drawings more in detail and especially to Figures 1 and 2, the numeral 1 indicates the body of the artificial bait or lure formed of metal or other appropriate material and which is curved longitudinally and provided with an upwardly turned head 2 and tail 3. It will be understood of course, that while an ordinary fish-tail is indicated by numeral 3, this specific design is not essential; a pointed or squared end may terminate the bait if desired.

In the form of the invention shown in Figures 1 and 2, the lure is provided with the vertical wall 4 which is intermediate the main body 1 and the inclined plane or head 2. It is this inclined head 2 which causes the lure to come to the surface of the water when drawn at the proper speed.

Swivelly attached to the vertical wall 4 is an eye or ring 5 to which the fishing line 6 is secured, while the eyes 7 swivelly connect the hooks 8 to the underside of the body 1. By thus attaching the line slightly to the rear of the forward end of the bait the desired wiggling movement is obtained due to the pressure of the water on the head 2 and vertical wall 4. This wiggling action is also increased somewhat by the upwardly curved tail 3.

In the form of the invention shown in Figure 3 the lure 10 is curved from end to end in substantially the manner disclosed in Figures 1 and 2 except that the vertical wall 4 is omitted. In this latter form of the invention the line 6 is also attached to the underside of the lure as indicated by numeral 5, and this attachment is made at a point to the rear of the forward end of the lure so as to cause a wiggling action as soon as the lure is drawn through the water. In this form of the invention as well as in the forms shown in Figures 4 and 5 the lure is provided with the hooks 8 which are swivelly mounted on the underside thereof and aid in preventing the lure from revolving or spinning and thus twisting the line.

In Figure 4 is shown a lure 20 which is substantially the same as that shown in Figure 3 except that only the head 21 is curved upwardly, the main body portion and tail being flat or in a single plane as indicated. This lure also when being drawn through the water will assume a wiggling movement due to the upwardly curved head 21 which extends forward of the point at which the line 6 is attached to the lure.

The modification shown in Figure 5 differs from the construction shown in Figures 3 and 4 in the fact that the lure 30 is provided with a substantially flat body and head formed in a single plane, while the tail 31 is bent upwardly on a curve as shown. This curved rear end 31 will also give rise to a wiggling action as the lure is drawn through the water though perhaps not to the marked extent developed in the preceding forms of the invention.

In all forms of the invention disclosed the lures are of sufficient weight to cast properdy and have their surfaces formed with representations of scales, spines, etc., in simulation of a fish.

From the foregoing description taken in connection with the accompanying drawings it will be apparent that I have devised an extremely simple and inexpensive lure which when drawn through the water will produce a very life-like simulation of a swimming minnow due to its wiggling action and that this movement will be imparted to the feathers or pork rind which may be attached to the hooks or body.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:—

1. A fish lure formed of a single strip of material curved from end to end and flat in cross section means spaced from the forward end thereof for securing a line, and a fish hook attached to said lure.

2. A fish lure formed of a curved metal strip, and flat in cross section hooks attached to the convex or underside of said lure, and means adjacent the forward end of said lure for attaching a line.

3. A fish lure stamped from sheet metal so as to provide an upwardly curved forward end, and being flat in cross section means for attaching a line to the underside of said lure adjacent the forward end thereof, and fish-hooks depending from said lure.

4. A fish lure stamped from sheet metal so as to provide an upwardly curved rear end, and being flat in cross section means for attaching a line to the underside of said lure adjacent the forward end thereof, and fish hooks depending from said lure.

5. A fish lure stamped from sheet metal and curved from end to end, and being flat in cross section hooks swivelled to the convex or underside of said lure, and a line swivelled to the forward portion of said lure.

6. A fish lure stamped from sheet metal and provided with scales and spines in simulation of a fish, said lure being curved longitudinally and flat in cross section, hooks swivelly connected to the convex side of said lure and a casting line swivelly connected to said lure slightly to the rear of the forward end thereof.

HENRY S. DILLS.